March 31, 1959 C. A. BURGESS 2,880,396

BRIDGE NETWORKS

Filed July 16, 1956 2 Sheets-Sheet 1

INVENTOR: Cyril A. Burgess

By Ralph B. Stewart ATTORNEY

INVENTOR
Cyril A. Burgess
BY
Ralph B. Stewart
ATTORNEY

United States Patent Office 2,880,396

Patented Mar. 31, 1959

2,880,396

BRIDGE NETWORKS

Cyril Arthur Burgess, Taplow, England, assignor to British Telecommunications Research Limited, Taplow, England Application July 16, 1956, Serial No. 598,001

Claims priority, application Great Britain July 21, 1955

6 Claims. (Cl. 333—11)

The present invention relates to bridge networks particularly, but not exclusively, for enabling two radio transmitters to be coupled to a common aerial.

An object of the invention is to provide an improved bridge network for use with coaxial cables in enabling two radio transmitters to be coupled to a common aerial. In one aspect of the invention the bridge network makes use of coaxial cables in providing an impedance element of the bridge.

Figures 1, 2, 3:
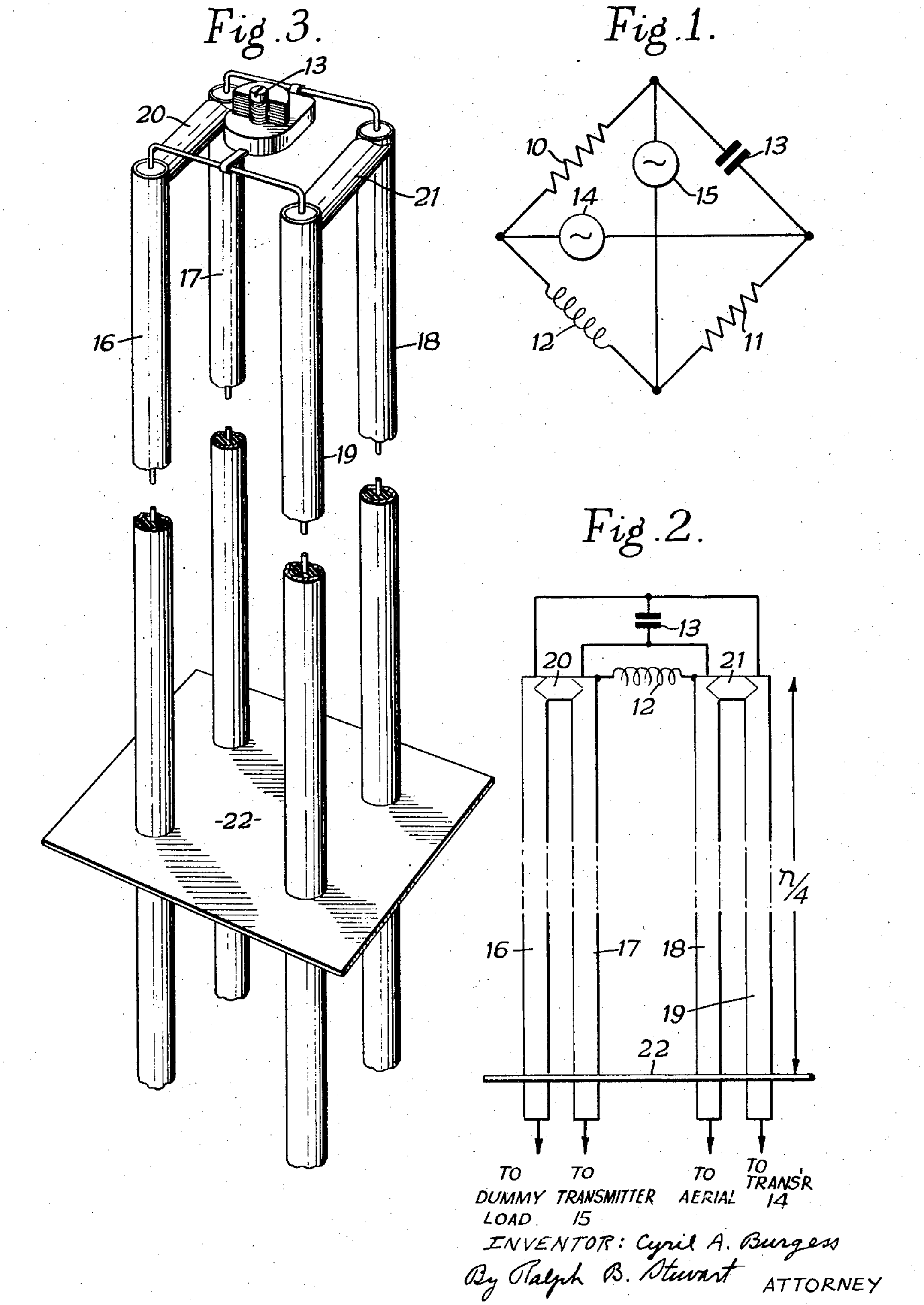

Other objects and aspects of the invention will be apparent from the following description given with reference to the accompanying drawings, in which:

Fig. 1 is a circuit diagram of a fundamental bridge circuit by means of which two transmitters can be coupled to a common aerial, Fig. 2 is a drawing of one embodiment of the invention, and Fig. 3 is a drawing of a second embodiment of the invention.

Referring to Figure 1 of the accompanying drawings this is a circuit diagram of a fundamental bridge circuit by means of which two transmitters can be coupled to a common aerial. In the bridge there are two resistors 10 and 11, an inductor 12 and a capacitor 13. Two radio transmitters are shown symbolically at 14 and 15. If the resistances of the resistors are each of R ohms and $\sqrt{L/C}=R$ where L and C are the inductance and capacitance of the inductor 12 and the capacitor 13 respectively it can be shown that the impedance presented to each of the two transmitters is R ohms at all frequencies. Furthermore the voltage appearing across each transmitter from the other is zero at all frequencies. In applying such an arrangement for coupling two transmitters to a common aerial one of the resistors is made the aerial and the other resistor is a dummy load.

In adapting such an arrangement for feeding a turnstile aerial array the two elements of the array take the place of the resistors.

When used for coupling two transmitters to a common aerial the total power will divide equally between the aerial and the dummy load and the optimum operating condition is achieved when $\omega L=1/\omega C=R$ where $\omega=2\pi f$ and $f$ is the mean frequency of the two transmitters.

In the very high frequency band it is often desirable to employ coaxial cables for transmitting power from the transmitters to the aerial and a modified form of Figure 1 enabling coaxial cables to be used is shown in Figure 2. Four coaxial cables are shown at 16, 17, 18 and 19 respectively. The coaxial cable 16 connects the dummy load into the bridge circuit, coaxial cable 17 connects the transmitter 15 into the bridge circuit, coaxial cable 18 connects the bridge circuit to the aerial and coaxial cable 19 connects the transmitter 14 into the bridge circuit.

The upper end (in the drawing) of the inner conductor of the coaxial cable 16 is connected to the upper end of the inner conductor of the coaxial cable 19, and the upper end of the inner conductor of the coaxial cable 17 is connected to the upper end of the inner conductor of the coaxial cable 19 as shown. Between these connections is connected the capacitor 13. The upper ends of the outer conductors of the coaxial cables 16 and 17 are short-circuited together as shown at 20 and the upper ends of the outer conductors of the coaxial cables 18 and 19 are short-circuited together as shown at 21. The inductor 12 is connected between the outer conductors of the coaxial cables 17 and 18. For the purpose of isolating the upper ends of the outer conductors of the cables 16 and 17 from the upper ends of the outer conductors of the cables 18 and 19, the outer conductors of all four cables are short-circuited together at a distance of a quarter of a wavelength from the upper ends thereof as shown by a short-circuiting bar at 22.

The known arrangement of Figure 2 suffers from two principal disadvantages however, namely, that a quarter of a wavelength is inconveniently long at the lower end of the V.H.F. wave band where the wavelengths are of the order of 10 metres, and the Q-factor of the inductor is not sufficiently high for some purposes.

It is one object of the present invention to provide an improved bridge circuit suitable for connecting two radio transmitters to a common aerial whereby the aforesaid disadvantages can be overcome.

According to the present invention an alternating current bridge network suitable for use with radio-frequency currents of frequency $f$, comprises means providing a capacitive reactance of $1/\omega C$ between first and second terminals, means providing an impedance Z approximately equal to $1/\omega C$ between the second terminal and a third terminal, a short-circuited transmission line connected between the third terminal and a fourth terminal the electrical length of the transmission line from the third and fourth terminals to the short circuit being such that the line provides an inductive reactance of L approximately equal to $1/\omega C$, and means providing a further impedance approximately equal to Z between the fourth and first terminals.

One embodiment of the invention is shown in Figure 3 of the accompanying drawings and comprises the coaxial lines 16, 17, 18 and 19 as in Figure 2, the short-circuiting pieces 20 and 21, the capacitor 13 and the short-circuiting piece 22 which short-circuits together the outer conductors of the coaxial transmission lines.

In Figure 3, however, the inductor 12 (Fig. 2) is not provided in the form of a lumped impedance element. The short-circuiting piece 22 is arranged at a distance from the upper ends of the coaxial transmission lines which is shorter than the $\lambda/4$ used in Figure 2. In Figure 3 the outer conductors of the transmission lines 16 and 17 short-circuited together form one limb of a transmission line and the outer conductors of the transmission lines 18 and 19 short-circuited together form the other limb of the transmission line. This line is short-circuited by the short-circuiting piece 22 at a distance appropriate to provide a reactance equal to that of the inductor 12 of Figure 2. The reduction that can be effected in the distance of the short-circuiting piece 22 from the upper ends of the coaxial transmission lines is considerable and the Q-factor of the effective inductance provided can be substantially higher than is the case when a lumped inductance element is used.

Figure 4:
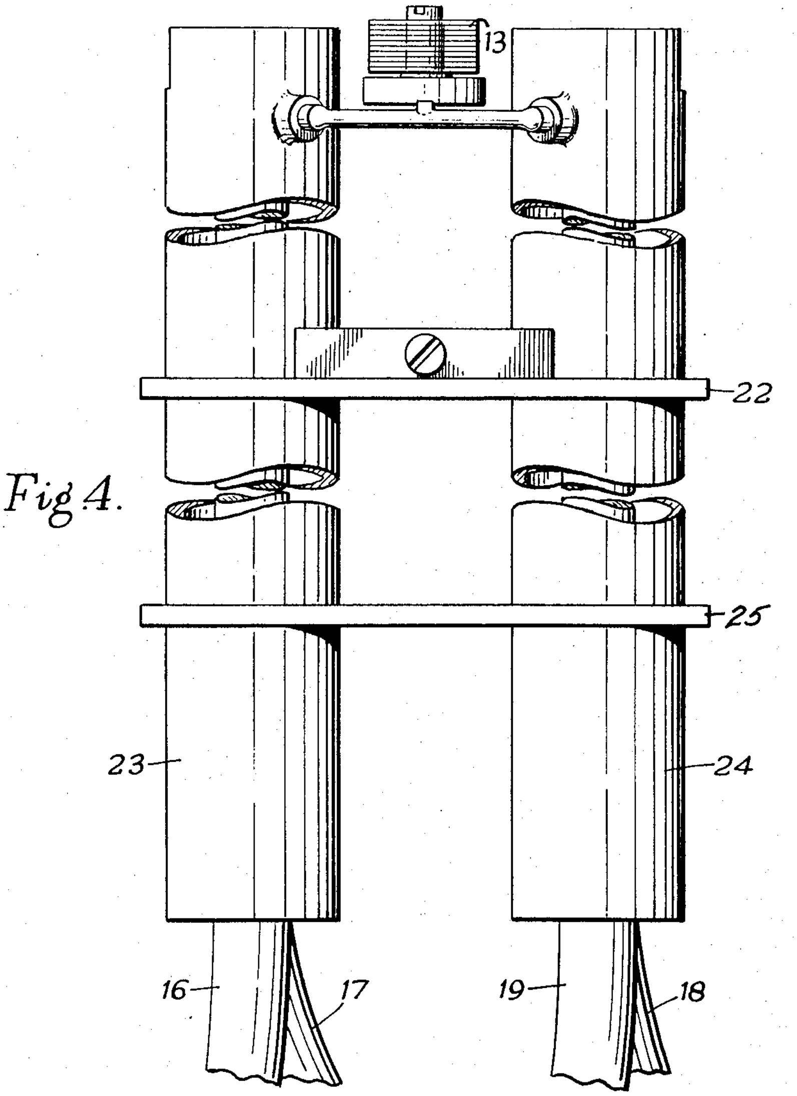
Figure 5:
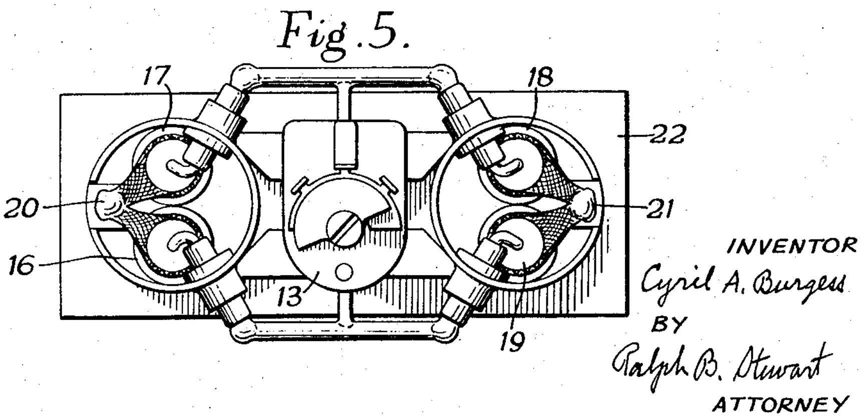

A second embodiment of the invention is shown in Figures 4 and 5 of which Figure 4 is an elevation and Figure 5 is a plan view. In this second embodiment the coaxial transmission lines 16 and 17 pass through a metal tube 23 and the coaxial transmission lines 18 and 19 pass through a metal tube 24. The upper ends of the outer conductors of the transmission lines 16 and 17 are short-circuited to the upper end of the tube 23 as can be seen in Figure 5, and the upper ends of the outer conductors of the transmission lines 18 and 19 are short-circuited to the upper end of the tube 24 as can be seen in Figure 5. The two tubes 18 and 19 form a transmission line which is short-circuited by the short-circuiting piece 22 at a distance from the upper ends thereof suitable to provide the necessary inductance. A second, fixed, plate 25 bridges the tubes 23 and 24 and serves to stiffen and strengthen the structure. In one application of an arrangement as shown in Figures 4 and 5 the spacing between the centres of the tubes is four times the diameter of each tube. This provides a transmission line of characteristic impedance of approximately 157 ohms. The characteristic impedance of the coaxial cables 16 to 19 is 75 ohms and the short-circuiting piece 22 is arranged at a distance of 0.071 of a wavelength from the upper ends of the tubes 23 and 24, the position of the short-circuiting piece 22 being readily adjustable.

Since the input impedance presented to the transmitters is equal to the aerial impedance the two inputs to the bridge can be connected to the outputs of two further bridges of the same construction whereby four transmitters can be connected to the same aerial. This method of connecting transmitters to a common aerial can be extended to any number of transmitters.

The bridge can be used for feeding a turnstile aerial array as there is a phase difference of 90° between the voltages fed to the aerial and the dummy load. In using the bridge for this purpose the two elements of a turnstile array take the place of the aerial and dummy load respectively. Either one or two transmitters can be connected to a turnstile aerial array by means of the bridge.

Furthermore the bridge may be used for feeding power from one transmitter to two or more aerials since a second aerial can take the place of the dummy load. The two outputs from the bridge (aerial and dummy load) can be applied through two further bridges of like construction to feed four aerials and so on. The lengths of the transmission lines between the bridges and between bridges and the aerials must of course be such as to give correct phasing.

I claim:

1. An alternating current bridge network suitable for use with radio-frequency currents of frequency $f$, comprising a capacitor of capacitance C providing a capacitive reactance of $1/\omega C$, an impedance element of impedance Z approximately equal to $1/\omega C$ connected into the network by means of a first coaxial cable, an input circuit connected to the bridge by means of a second coaxial cable, the inner conductors of the said coaxial cables terminating on the two plates respectively of the capacitor and the ends adjacent the capacitor of the outer conductors of the coaxial cables being short-circuited to one another, a second impedance element of impedance approximately Z connected into the bridge by means of a third coaxial cable, and a further input circuit connected to the bridge by means of a fourth coaxial cable, the inner conductors of the third and fourth coaxial cables terminating on the same plates of the capacitor as the inner conductors of the second and first coaxial cables respectively, the ends adjacent the capacitor of the outer conductors of the third and fourth coaxial cables being short-circuited together, all said coaxial cables being arranged parallel to one another proceeding from the capacitor, and the outer conductors of all four cables being short-circuited to one another at a distance from the capacitor such that there is provided between the common termination of the outer conductors of the first and second coaxial cables and the common termination of the third and fourth coaxial cables an inductive impedance $\omega$L approximately equal to $1/\omega C$.

2. An alternating current bridge network suitable for use with radio-frequency currents of frequency $f$, comprising a capacitor of capacitance C providing a capacitive reactance of $1/\omega C$, an impedance element of impedance Z approximately equal to $1/\omega C$ connected into the network by means of a first coaxial cable, an input circuit connected to the bridge by means of a second coaxial cable, the inner conductors of the said coaxial cables terminating on the two plates respectively of the capacitor and the ends adjacent the capacitor of the outer conductors of the coaxial cables being short-circuited to one another, a second impedance element of impedance approximately Z connected into the bridge by means of a third coaxial cable, and a further input circuit connected to the bridge by means of a fourth coaxial cable, the inner conductors of the third and fourth coaxial cables terminating on the same plates of the capacitor as the inner conductors of the second and first coaxial cables respectively, the ends adjacent the capacitor of the outer conductors of the third and fourth coaxial cables being short-circuited together, an end section of each of the first and second coaxial cables being disposed within a first metal tube, an end section of each of the third and fourth coaxial cables being disposed within a second metal tube disposed parallel to the first tube, the common termination of the outer conductors of the first and second coaxial cables being short-circuited to the adjacent end of the first tube, the common termination of the outer conductors of the third and fourth coaxial cables being short-circuited to the adjacent end of the second tube, and a further short-circuit being provided between the two tubes at a distance from the capacitor such that there is provided between the common termination of the outer conductors of the first and second coaxial cables and the common termination of the third and fourth coaxial cables and inductive reactance $\omega$L approximately equal to $1/\omega C$.

3. In combination a first radio transmitter of angular frequency $\omega$ a second radio transmitter of the same angular frequency $\omega$, a single aerial system of impedance Z, and a bridge network connecting both said transmitters to said aerial system, said network comprising a capacitive reactance of $1/\omega C$ approximately equal to Z connected between first and second terminals, means providing an impedance of approximately Z a first coaxial cable, connecting said impedance Z between said second terminal and a third terminal, inductive means providing inductive reactance $\omega$L approximately equal to Z connected between said third terminal and a fourth terminal, a second coaxial cable connecting one of said transmitters between said first and third terminals, a third coaxial cable connecting said single aerial system between said fourth and first terminals, and a fourth coaxial cable connecting the other of said transmitters between said second and fourth terminals, said inductive reactance being constituted by a short-circuited parallel-conductor open transmission line the ends of the two limbs of which are connected to said third and fourth terminals respectively.

4. A combination as claimed in claim 3, wherein one limb of the parallel-conductor open transmission line is constituted by the outer conductors of said first and second coaxial cables, arranged in parallel relation and both being connected to said third terminal, and the other limb of the parallel-conductor open transmission line is constituted by the outer conductors of said third and fourth coaxial cables, arranged in parallel relation and both being connected to said fourth terminal.

5. A combination as claimed in claim 3, wherein the two limbs of said parallel-conductor open transmission comprise two metal tubes disposed parallel with one another, one of said tubes embracing and being connected to the outer conductors of said first and second coaxial cables, and the other tube embracing and being connected to the outer conductors of said third and fourth coaxial cables.

6. A bridge network comprising four coaxial cables arranged in spaced parallel relation and having one set of ends terminating in a common plane, a conducting bridge joining the ends of the outer conductors of two of said cables, a second conducting bridge joining the ends of the outer conductors of the remaining pair of said cables, the inner conductors of two of said cables in different pairs being connected to a common terminal, the inner conductors of the remaining pair of cables being connected to a second terminal, a capacity element connected across said terminals, and means short-circuiting the outer conductors of all four of said cables in a plane spaced from said first-mentioned plane a distance sufficient to provide an inductive reactance between said bridge members substantially equal in value to the capacity reactance of said capacity member.

References Cited in the file of this patent

UNITED STATES PATENTS

| | | |
|---|---|---|
| 2,484,028 | Hansen | Oct. 11, 1949 |
| 2,779,000 | Sosin | Jan. 22, 1957 |